United States Patent
Dunfee et al.

(10) Patent No.: US 11,231,309 B2
(45) Date of Patent: Jan. 25, 2022

(54) QUICK CONNECTION FOR LIQUID LEVEL SENSE-ENABLED METERING PROBE

(71) Applicant: Siemens Healthcare Diagnostics Inc., Tarrytown, NY (US)

(72) Inventors: William D. Dunfee, Newark, DE (US); Amanda H. Schaffers, Cary, NC (US); Stephen Krufka, Newark, DE (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 597 days.

(21) Appl. No.: 16/095,904

(22) PCT Filed: May 10, 2017

(86) PCT No.: PCT/US2017/032014
§ 371 (c)(1),
(2) Date: Oct. 23, 2018

(87) PCT Pub. No.: WO2017/197021
PCT Pub. Date: Nov. 16, 2017

(65) Prior Publication Data
US 2021/0223087 A1    Jul. 22, 2021

Related U.S. Application Data

(60) Provisional application No. 62/334,776, filed on May 11, 2016.

(51) Int. Cl.
*G01F 23/26* (2006.01)
*G01N 35/10* (2006.01)

(52) U.S. Cl.
CPC .......... *G01F 23/268* (2013.01); *G01F 23/265* (2013.01); *G01N 35/1009* (2013.01); *G01N 2035/1025* (2013.01)

(58) Field of Classification Search
CPC ...... G01F 23/263; G01F 23/268; G01F 23/26; G01F 23/24; G01F 23/241; G01F 23/242
See application file for complete search history.

(56) References Cited

U.S. PATENT DOCUMENTS 3,167,695 A * 1/1965 Bronson ............... G01F 23/268
361/284
3,349,301 A * 10/1967 Bell ...................... G01F 23/268
361/284

(Continued)

FOREIGN PATENT DOCUMENTS

CN    2588334 Y  * 11/2003
CN    2869802 Y    2/2007

(Continued)

OTHER PUBLICATIONS

ESPACENET Machine Translation of CN-2588334 Y Which Originally Published on Nov. 26, 2003. (Year: 2003).*

(Continued)

*Primary Examiner* — David A. Rogers

(57) ABSTRACT

Embodiments are directed to a simple, tool-less, and automated connection between a transfer probe and a capacitive liquid level detection printed circuit assembly (PCA) for use in a clinical analyzer in an in vitro diagnostics (IVD) environment in a hospital or laboratory setting. Advantageously, a single user connection is required: a fitting that is used to attach fluid tubing of the transfer arm to a probe, resulting in a mechanical, fluid, and electrical connection between the probe and the transfer arm. A PCA comprises a plurality of spring-loaded pins and capacitive liquid level detection circuity. A probe comprises a primary tube nested within a secondary tube, wherein the primary tube and the secondary tube comprise respective heads at respective top portions thereof forming a set of electrically isolated sur- (Continued)

faces. The fitting secures the probe within a transfer arm and establishes the connection between the PCA and the probe.

20 Claims, 13 Drawing Sheets

(56) References Cited

U.S. PATENT DOCUMENTS

| | | | | |
|---|---|---|---|---|
| 3,367,183 | A * | 2/1968 | Webster | G01F 23/263 |
| | | | | 73/304 C |
| 3,524,116 | A * | 8/1970 | William | G01F 9/001 |
| | | | | 361/284 |
| 3,754,444 | A | 8/1973 | Ure et al. | |
| 3,933,042 | A | 1/1976 | Rector et al. | |
| 4,212,202 | A * | 7/1980 | Schmidt | G01F 23/263 |
| | | | | 361/284 |
| 4,417,473 | A | 11/1983 | Tward et al. | |
| 5,045,286 | A * | 9/1991 | Kitajima | G01F 23/245 |
| | | | | 422/518 |
| 5,121,631 | A * | 6/1992 | Koon | G01F 23/268 |
| | | | | 340/620 |
| 5,212,992 | A * | 5/1993 | Calhoun | B01L 3/021 |
| | | | | 324/690 |
| 5,240,679 | A * | 8/1993 | Stettler | G01N 35/1079 |
| | | | | 422/562 |
| 5,639,426 | A * | 6/1997 | Kerr | B01L 3/0275 |
| | | | | 422/501 |
| 5,855,851 | A * | 1/1999 | Matsubara | G01F 23/263 |
| | | | | 422/511 |
| 5,857,860 | A * | 1/1999 | Silliman | H04N 7/104 |
| | | | | 439/171 |
| 6,148,681 | A * | 11/2000 | Gravel | G01F 23/268 |
| | | | | 73/866.5 |
| 6,546,795 | B1 | 4/2003 | Dietz | |
| 6,551,558 | B1 * | 4/2003 | Mann | G01F 23/24 |
| | | | | 116/109 |
| 6,604,054 | B2 * | 8/2003 | Lipscomb | G01N 35/1009 |
| | | | | 138/104 |
| 6,914,555 | B2 * | 7/2005 | Lipscomb | G01N 35/1009 |
| | | | | 324/647 |
| 6,935,173 | B2 * | 8/2005 | Stehman | G01F 23/263 |
| | | | | 73/290 R |
| 7,191,647 | B2 * | 3/2007 | Harazin | G01F 23/26 |
| | | | | 73/290 R |
| 7,222,526 | B2 * | 5/2007 | Baker | G01F 23/266 |
| | | | | 73/290 R |
| 7,322,833 | B1 * | 1/2008 | Hakansson | H01Q 1/38 |
| | | | | 439/67 |
| 7,390,197 | B2 | 6/2008 | Merz | |
| 7,413,710 | B2 * | 8/2008 | Lisec | B01L 3/022 |
| | | | | 422/417 |
| 7,479,391 | B2 * | 1/2009 | Bjornson | G01N 35/1009 |
| | | | | 422/417 |
| 7,603,899 | B2 * | 10/2009 | Li | G01F 23/263 |
| | | | | 73/304 C |
| 8,298,009 | B2 | 10/2012 | Elkhatib et al. | |
| 8,911,685 | B2 | 12/2014 | Watanabe et al. | |
| 9,310,327 | B2 | 4/2016 | Roper et al. | |
| 9,604,043 | B2 * | 3/2017 | King | A61M 31/00 |
| 9,671,419 | B2 * | 6/2017 | Sugiyama | G01N 35/021 |
| 9,778,275 | B2 * | 10/2017 | Mellars | G01N 35/0099 |
| 9,791,469 | B2 * | 10/2017 | Wilmes | B01L 3/021 |
| 2003/0066364 | A1 * | 4/2003 | Bargh | G01N 35/0099 |
| | | | | 73/864.16 |
| 2004/0093943 | A1 | 5/2004 | Arias | |
| 2005/0123445 | A1 | 6/2005 | Blecka et al. | |
| 2007/0209440 | A1 | 9/2007 | Dockendorff et al. | |
| 2008/0295618 | A1 * | 12/2008 | Angus | B01L 3/0279 |
| | | | | 73/864.14 |
| 2009/0071245 | A1 * | 3/2009 | Harazin | G01F 23/266 |
| | | | | 73/290 R |
| 2009/0234597 | A1 * | 9/2009 | Wilby | G01F 23/268 |
| | | | | 702/55 |
| 2012/0051984 | A1 | 3/2012 | Dudenhoefer et al. | |
| 2013/0261539 | A1 * | 10/2013 | King | G01F 23/265 |
| | | | | 604/65 |
| 2013/0319108 | A1 * | 12/2013 | Trump | G01F 11/00 |
| | | | | 73/304 C |
| 2014/0024133 | A1 * | 1/2014 | Carter, Jr. | B01F 15/00253 |
| | | | | 436/174 |
| 2014/0104079 | A1 * | 4/2014 | Bommer | G01F 23/26 |
| | | | | 340/945 |
| 2014/0178251 | A1 | 6/2014 | Yamada et al. | |
| 2014/0260697 | A1 * | 9/2014 | Staton | B01L 3/0275 |
| | | | | 73/864.01 |
| 2015/0268230 | A1 * | 9/2015 | Endo | G01F 23/00 |
| | | | | 422/69 |
| 2015/0276534 | A1 | 10/2015 | Dunfee | |
| 2016/0003662 | A1 * | 1/2016 | Dayal | G01R 27/2605 |
| | | | | 73/304 R |
| 2016/0146657 | A1 * | 5/2016 | Dulaff | G01F 23/284 |
| | | | | 73/290 V |
| 2021/0121827 | A1 * | 4/2021 | Wegener | A61M 1/0209 |

FOREIGN PATENT DOCUMENTS

| | | |
|---|---|---|
| CN | 101135584 A | 3/2008 |
| CN | 102288260 A | 12/2011 |
| CN | 202182753 U | 4/2012 |
| CN | 103675367 A | 3/2014 |
| CN | 102980630 B | 12/2015 |
| DE | 19919597 C1 | 6/2000 |
| EP | 1744132 A1 | 1/2007 |
| JP | S59-107524 A | 6/1984 |
| JP | H02-059619 A | 2/1990 |
| JP | H05-340789 A | 12/1993 |
| JP | H08-122126 A | 5/1996 |
| JP | H11-218539 A | 8/1999 |
| JP | 2009-122067 A | 6/2009 |
| WO | 2017/142987 A1 | 8/2017 |
| WO | 2017/197116 A1 | 11/2017 |

OTHER PUBLICATIONS

PCT International Search Report and Written Opinion dated Oct. 7, 2017 (11 Pages).

Extended EP Search Report dated Jun. 28, 2019 of corresponding European Application No. 17796792.4, 4 Pages.

Zhizhuang, Liu et al: "The Design of an Intelligent Liquid Level Instrument r"; 2007; 1008-0570(2007)02-1-0156-02/ 31.12.2007.

* cited by examiner

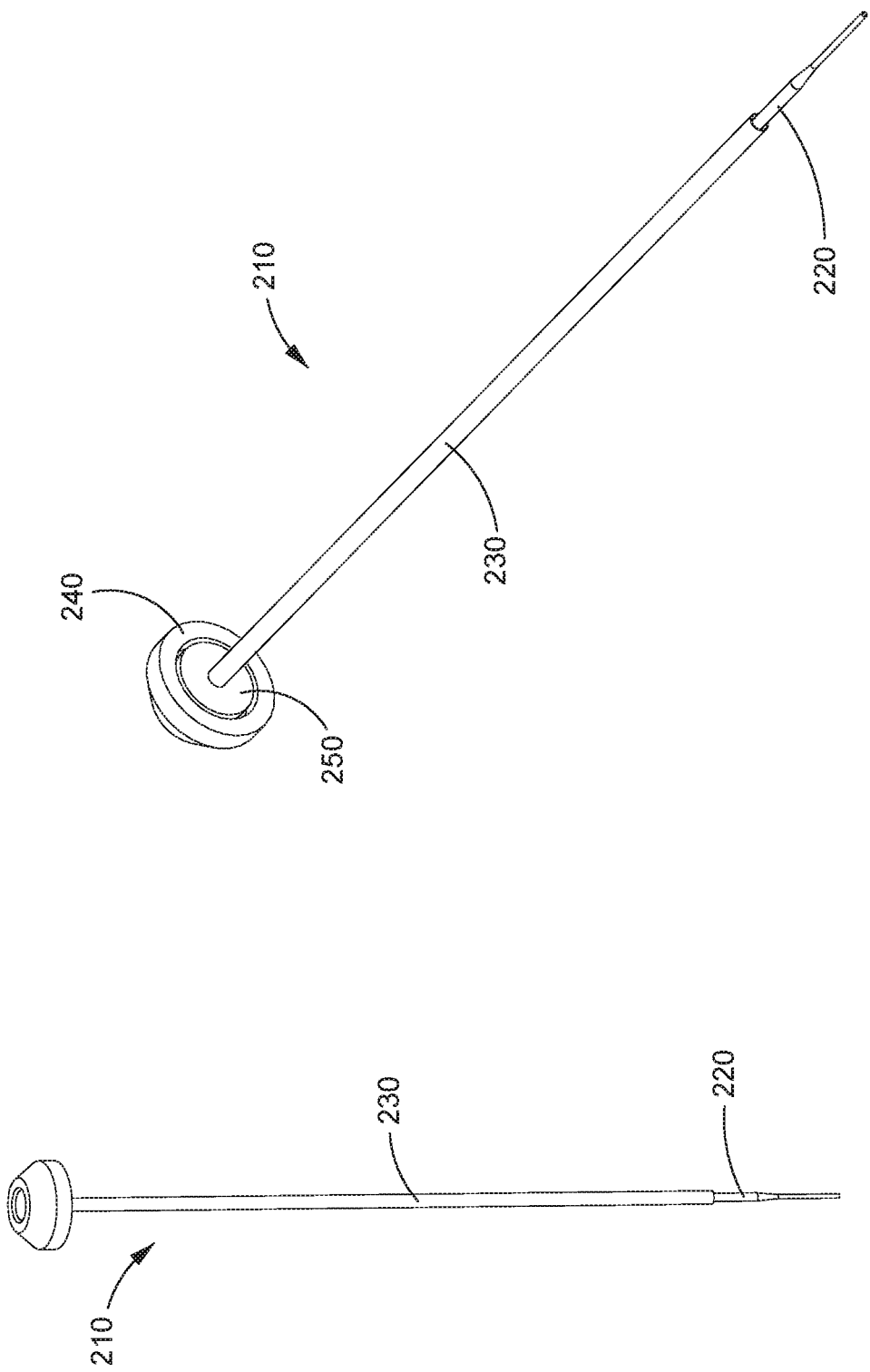

QUICK CONNECTION FOR LIQUID LEVEL SENSE-ENABLED METERING PROBE

CROSS-REFERENCE TO RELATED APPLICATIONS

This application claims priority to U.S. provisional application Ser. No. 62/334,776 filed May 11, 2016, the contents of which is incorporated herein by reference in its entirety.

This application is further related to U.S. provisional application Ser. No. 62/297,264, filed Feb. 19, 2016 and entitled "Single-Piece Transfer Arm Structure for Analytical Instrumentation," and to U.S. provisional application Ser. No. 62/335,349, filed May 12, 2016 and entitled "Clinical Analyzer Probe Crash Detection Mechanism and Process," both of which are incorporated herein by reference in their entirety.

TECHNOLOGY FIELD

The present invention relates generally to a transfer arm in an in vitro diagnostics environment and, more particularly, to a capacitive liquid level detection circuit attached to a probe in a transfer arm.

BACKGROUND

Clinical analyzers typically require a transfer arm to position a fluid transfer probe (or needle) and move the probe between various locations to aspirate a fluid and to dispense a fluid; for example, between a reagent container and a reaction vessel. Multiple transfer arms are typically used to handle such transfers for an analysis of a sample.

In many cases, it is advantageous to determine the location of the liquid level in the container or vessel being accessed by the transfer probe. This can serve to minimize the depth to which the probe descends into the liquid, which, in turn, minimizes potential for carryover, need for washing the exterior of the probe, spatter generated by liquid coming off the exterior of the probe, and unwanted liquid carryout from the container. One method of determining liquid level in a container is through a capacitive liquid level detection circuit attached to the probe. This type of circuit measures the capacitance of the probe many times per second. When the probe touches liquid (or any material with different dielectric or conductive properties), the measured capacitance changes suddenly, and this change is sensed by the circuit. Using the probe itself to sense the liquid level has multiple advantages over other methods; for example, it is independent of container geometry.

To achieve the probe capacitance sensing, a reliable connection to the capacitive level detection circuit is necessary. Additionally, it is often advantageous to cover a portion of the probe with a grounded shield to prevent or minimize external electromagnetic influences, so that only the tip of the probe is sensitive to capacitive changes. Changes in resistance or capacitance introduced by the connection can cause false positive detection events.

It is also desirable for the probe, a routinely replaced item, to be easily user-replaceable. However, this requirement often conflicts with the above functionalities necessary for capacitive liquid level detection. For example, a typical connection from a probe to a capacitive liquid level detection circuit is a screwed connection between the probe, one or more wires, and a printed circuit assembly (PCA). Other approaches use expensive connectors (screw or twist type), either in-line or to the PCA itself. However, these types of connections significantly increase the difficulty with which a probe is changed, requiring the user to make multiple disconnections and often requiring the use of tools.

Thus, there is a need for a capacitive liquid level detection circuit for use with a transfer probe that is reliable, accurate, and easily replaceable.

SUMMARY

Embodiments are directed to a capacitive liquid level detection assembly for use with a transfer arm in, for example, a clinical analyzer in an in vitro diagnostics environment. Embodiments are further directed to a capacitive liquid level detection circuit attached to a probe in a transfer arm, in which a single fitting makes the connection therebetween.

In one embodiment, a capacitive liquid level detection assembly for use on a transfer arm in a clinical analyzer in an in vitro diagnostics (IVD) environment comprises: a capacitive liquid level detection printed circuit assembly (PCA) comprising a plurality of spring-loaded pins and capacitive liquid level detection circuity; a probe comprising a primary tube nested within a secondary tube, wherein the primary tube and the secondary tube comprise respective heads at respective top portions thereof forming a set of electrically isolated surfaces; and a fitting configured to secure the probe within the transfer arm and thereby establish a connection between the capacitive liquid level detection PCA and the probe. According to an embodiment, the circuity of the capacitive liquid level detection PCA is configured to detect a change in capacitance of the probe and send a level detection signal to a motor controller configured to control operation of the transfer arm.

In an embodiment, the connection comprises the spring-loaded pins of the capacitive liquid level detection PCA in contact with the set of electrically isolated surfaces of the probe. In an embodiment, a first of the plurality of the spring-loaded pins creates a circuit with the primary tube of the probe via contact with the head of the primary tube, and a second of the plurality of the spring-loaded pins grounds the secondary tube via contact with the head of the secondary tube.

According to an embodiment, upon receipt of the level detection signal, the motor controller decelerates the transfer arm.

In an embodiment, the capacitive liquid level detection assembly further comprises a lower board to which the capacitive liquid level detection PCA is soldered, the lower board flooded with a grounded copper plane.

In an embodiment, the transfer arm comprises a horizontally-extending chassis and a shaft oriented substantially perpendicular to the chassis, the chassis and the shaft coupled to one another by a coupler at a rear portion of the transfer arm. The motor controller is coupled to the shaft, and the capacitive liquid level detection PCA is mounted within an underside portion of the chassis. In an embodiment, the underside portion of the chassis is copper painted and grounded to the capacitive liquid level detection PCA through a mounting screw.

According to an embodiment, the capacitive liquid level detection assembly further includes a probe holder configured to clamp to a top portion of the probe and comprising a gap at a portion corresponding to the set of electrically isolated surfaces of the probe; and a probe guide comprising a vertically-oriented bore through which the probe passes, wherein a surface of the probe guide perpendicular to the bore mounts to an underside portion of the transfer arm. In an embodiment, the fitting is further configured to thread into the probe holder to clamp the probe into the probe holder. In an embodiment, the assembly further comprises at least one of a spring assembly and one or more pairs of magnets to secure the probe holder and the probe guide to one another.

In an embodiment, a system for detecting liquid in a container in a clinical analyzer in an in vitro diagnostics (IVD) environment comprises: a transfer arm comprising a horizontally-extending chassis and a shaft oriented substantially perpendicular to the chassis, the chassis and the shaft coupled to one another by a coupler at a rear portion of the transfer arm; a motor controller coupled to the shaft, the motor controller configured to control movement of the transfer arm; and a capacitive liquid level detection assembly housed within an underside portion of the chassis. In an embodiment, the capacitive liquid level detection assembly comprises a capacitive liquid level detection printed circuit assembly (PCA) comprising a plurality of spring-loaded pins; a probe comprising a primary tube nested within a secondary tube, wherein the primary tube and the secondary tube comprise respective heads at respective top portions thereof forming a set of electrically isolated surfaces; and a fitting configured to secure the probe within the transfer arm and thereby establish a connection between the capacitive liquid level detection PCA and the probe. Circuity of the capacitive liquid level detection PCA is configured to detect a change in capacitance of the probe and send a level detection signal to the motor controller.

According to an embodiment, a method of detecting liquid in a container in a clinical analyzer in an in vitro diagnostics (IVD) environment comprises: monitoring capacitance of a probe, by a capacitive liquid level detection printed circuit assembly (PCA) comprising a plurality of spring-loaded pins in contact with the probe; wherein the probe comprises a primary tube nested within a secondary tube; wherein a fitting secures the probe within a transfer arm of the clinical analyzer and thereby establishes the contact between the spring-loaded pins and the probe; and sending, by the PCA, a liquid level detection signal to a motor controller upon detection in a change of the capacitance of the probe.

In an embodiment, the monitoring the capacitance of the probe is initiated upon command from the motor controller.

In an embodiment, the method further comprises decelerating, by the motor controller, the transfer arm to allow the probe to reach a predefined depth in the liquid upon receipt of the liquid level detection signal from the PCA.

According to an embodiment, the detection in the change of the capacitance of the probe comprises the capacitance of the probe changing over a predetermined threshold value.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 2A-2D are diagrams illustrating features of a probe for use with embodiments described herein;

DETAILED DESCRIPTION

Embodiments are directed to a simple, tool-less, and automated connection between a transfer probe and a capacitive liquid level detection printed circuit assembly (PCA) for use in a clinical analyzer in an in vitro diagnostics (IVD) environment in a hospital or laboratory setting. Advantageously, according to embodiments provided herein, a single user connection is required: a fitting that is used to attach fluid tubing of the transfer arm to a probe.

Figure 1:
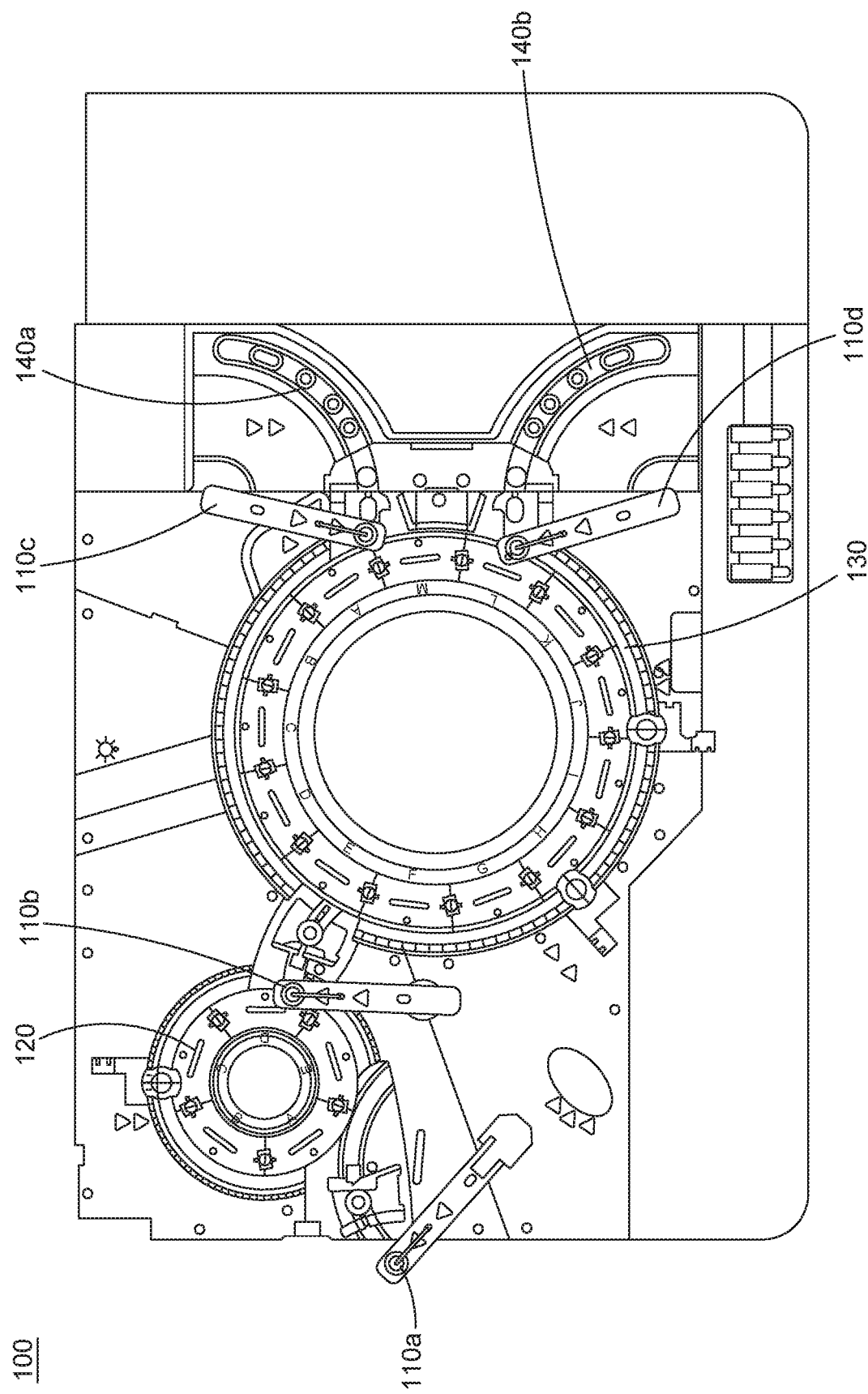
FIG. 1 is a layout of an example system architecture within which embodiments of the invention may be implemented, according to an embodiment.

FIG. 1 provides a layout of an example system architecture 100 within which embodiments of the invention may be implemented, according to an embodiment. Shown in FIG. 1 are various transfer arms 110 (110a, 110b, 110c, and 110d) with respective probes (see FIGS. 2A-2D and the associated description below for details relating to the probe); a diluting turntable 120 including a plurality of diluting containers arranged in one or more diluting rings; a reaction turntable 130 including a plurality of reaction containers arranged in one or more reaction rings; and reagent storage areas 140a and 140b dedicated to storage and supply of a respective reagent, each reagent storage area 140a and 140b including a plurality of reagent containers. In operation, transfer arm 110a and its respective probe may operate to transfer sample from an access position to one or more diluting containers on the diluting turntable 120 to create a dilution therein. Transfer arm 110b and its respective probe may operate to transfer dilution from a diluting container to a reaction container on the reaction turntable 130. Transfer arms 110c and 110d and their respective probes may operate to transfer a reagent from reagent storage area 140a and 140b, respectively, to a reaction container on the reaction turntable 130. The various transfers occur by use of a pumping mechanism, such as a displacement pump, for example, attached to the transfer arms 110. Additionally, the system architecture 100 includes one or more controllers (not shown) for controlling operation of the various components, including the transfer arms 110, the probes, and the turntables.

The system architecture 100 of FIG. 1 and the accompanying description are purely exemplary and non-limiting to the capacitive liquid level detection mechanism disclosed herein. The system architecture 100 is just one example system in which the capacitive liquid level detection mechanism may be implemented.

Figure 2D:
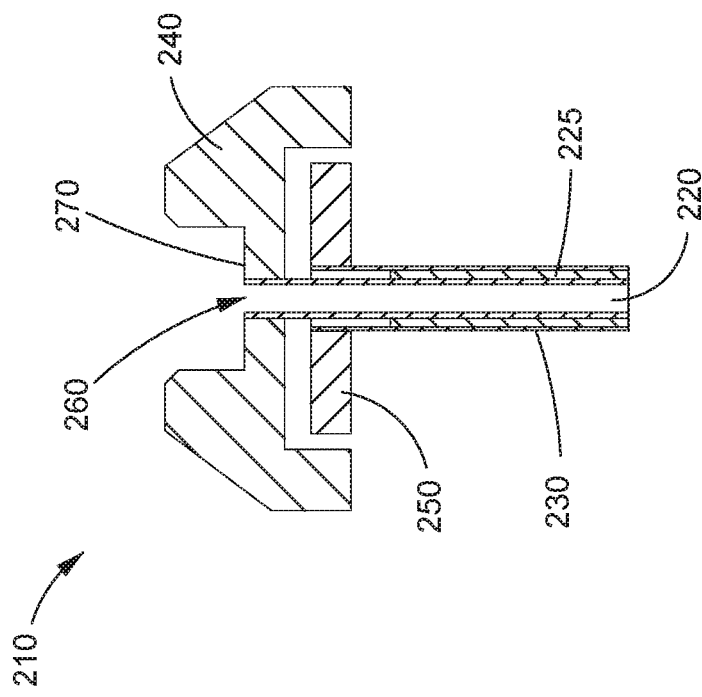
Figure 2C:
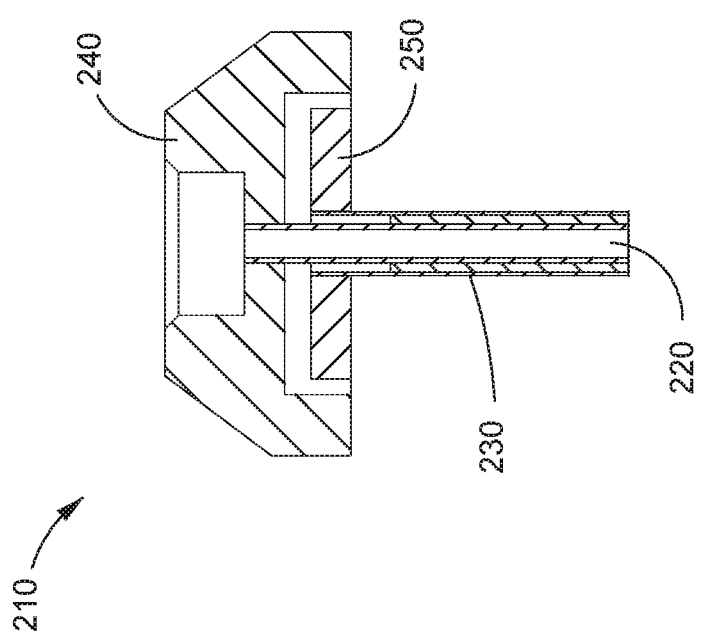

FIGS. 2A-2D are diagrams illustrating features of an exemplary probe 210 for use with embodiments described herein. FIG. 2A is a front view of the probe 210, 2B a perspective view, and 2C and 2D cross-sectional front views. The key function of the probe 210 is to reliably and precisely deliver or remove a specified amount of fluid to or from a vessel (e.g., a diluting container, a reaction container). The probe 210 interfaces securely with fluid tubing (see FIGS. 3-6 and the description below) and incorporates internal features that support a reliable fluid transfer. The geometry of the interior of the probe 210 is such that repeatable fluid flow is possible, while the surface finish of the probe 210 is fine enough to avoid interference with smooth fluid flow and to resist carryover between fluid transfers. Additionally, the probe 210 serves as an electrical connection between the capacitive liquid level detection PCA, so that minute capacitance changes may be detected at the tip of the probe 210 to determine when it is touching fluid. The electrical connection, according to embodiments provided herein, is robust and insensitive to false triggers.

With continued reference to FIGS. 2A-2D, features of the probe 210 are illustrated. The probe 210 is comprised of a primary tube (or inner probe) 220 partially nested within a secondary tube (or outer probe or ground shield) 230. The primary tube 220 is, according to an embodiment, made of stainless steel tubing, although other materials may be used. The primary tube 220 contains the aspirated and working fluids in fluid passageway 260. The tip of the primary tube 220 is used to sense the fluid surface as the probe 210 is descended into a container. Near the tip of the primary tube 220, an angled-taper is formed to optimize fluid flow and aid in transfer precision. In an embodiment, the angled-taper may be a 4° angle, which has been found to minimize flow losses and thus minimize turbulence. Other angles may of course also be used, dependent on, for example, the application and desired fluid flow properties. In other embodiments, the angled-taper design may not be necessary. The interior surface of the primary tube 220 may be finely polished to minimize carryover and ensure smooth fluid flow. A uniform, squared-off tip geometry of the primary tube 220 of the probe 210 may also be important, in some applications, to reduce carryover. The inner diameter of the primary tube 220 may be adjusted depending on the application for which the probe 210 is being utilized.

The secondary tube 230 may, according to an embodiment, be made of stainless steel tubing, although other materials may be used. The secondary tube 230 extends around a majority (i.e., greater than 50%) portion of the primary tube 220 (i.e., most, but not all, of the way from the top to the tip of the primary tube 220). Its function is to provide a grounded shield around the primary tube 220 of the probe 210. This helps to inhibit false level sense triggering when other objects may be nearby, inducing capacitance changes around the primary tube 220.

Each tube 220, 230 has a cylindrical cap or head attached (e.g., welded) at the top (primary tube contact ring 240 and secondary tube contact ring 250, respectively). The primary tube 220 and the secondary tube 230 are electrically isolated (via electrically isolating gap 225) yet securely attached to one another. This may be achieved through a layer of non-conductive material (e.g., heat shrink and epoxy) that fits securely between the tubes 220, 230 in the gap 225. The nesting orientation (within but without touching) allows each ring 240, 250 to reach the same horizontal level and provides for the rings 240, 250 to comprise a set of electrically isolated coplanar rings on the underside of the probe head. These rings 240, 250 create the surface to which electrical contact is made for the capacitive liquid level detection mechanism described herein. The outer ring 240 (connected to the inner, primary tube 220) makes a connection to the capacitive liquid level detection portion of the PCA, while the inner ring 250 provides the grounded connection to the outer, secondary tube 230 (i.e., the shield). In another embodiment, the cap or head attached to each tube 220, 230 is not cylindrical in shape but can be of another shape (such as, for example but not limited to, square), providing the electrically isolated surface for the contact with the capacitive liquid level detection mechanism described herein.

The lower joint between the primary tube 220 and the secondary tube 230 (at the end of the secondary tube 230) is, according to an embodiment, filled and potted with epoxy to provide a physical linear separation between the two tubes 220, 230. This prevents fluid droplets from filling the gap 225 between the tubes 220, 230 and shorting out the probe 210. In another embodiment, a physical separation between the primary tube 220 and the secondary tube 230 is achieved by extending heat shrink material residing between the tubes 220, 230 beyond the outer probe (i.e., the secondary tube 230). In yet another embodiment, the physical separation between the tubes 220, 230 is achieved by adding a plastic ferrule or the like to fill the gap 225 and extend downward to separate the two tubes 220, 230 and prevent fluid from bridging the gap 225.

According to embodiments, a capacitive liquid level detection assembly is applicable to the transfer arms 110 and respective probes 210 that perform the types of transfers described above, in order to detect a liquid level in a container with a probe 210 of a transfer arm 110 in an analyzer in an IVD environment, for example.

Figure 3:
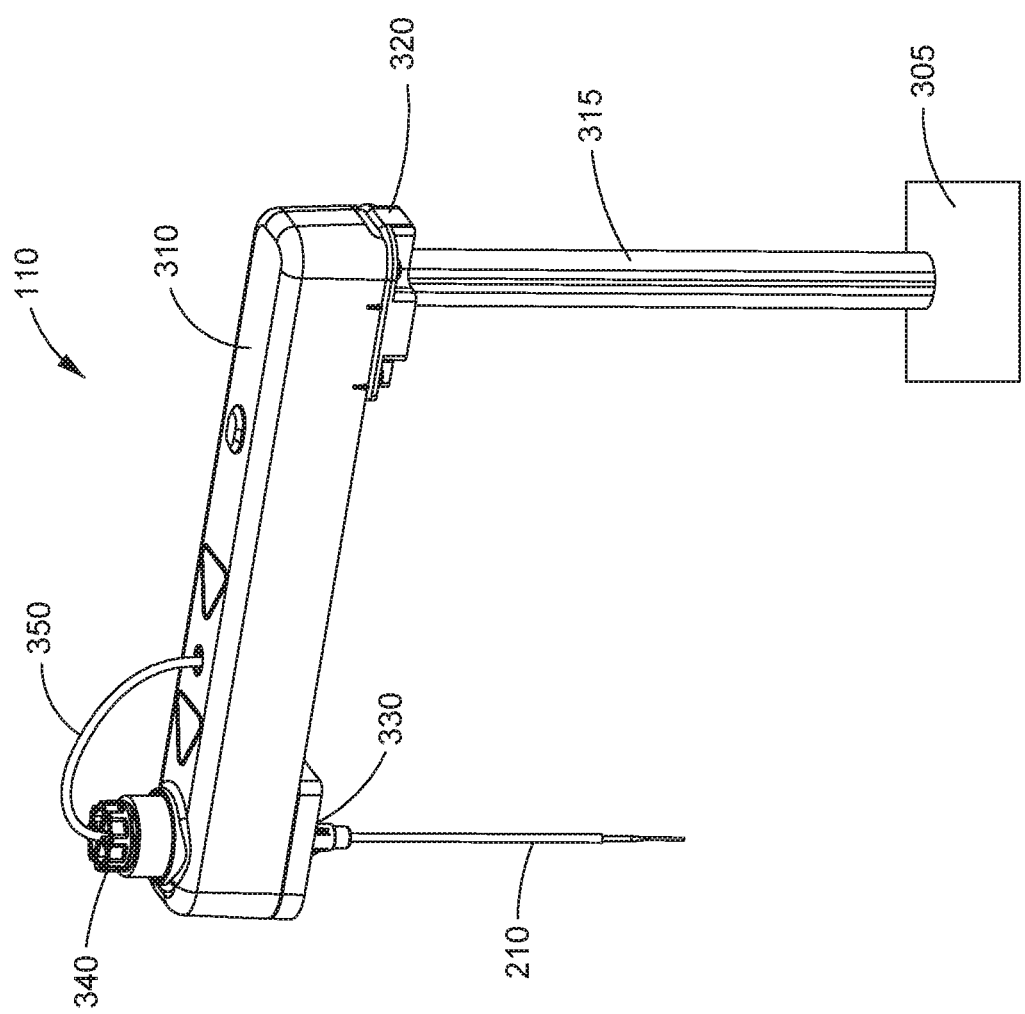
FIG. 3 is a diagram illustrating a top perspective view of a transfer arm with a capacitive liquid level detection assembly, according to an embodiment.
Figure 4:
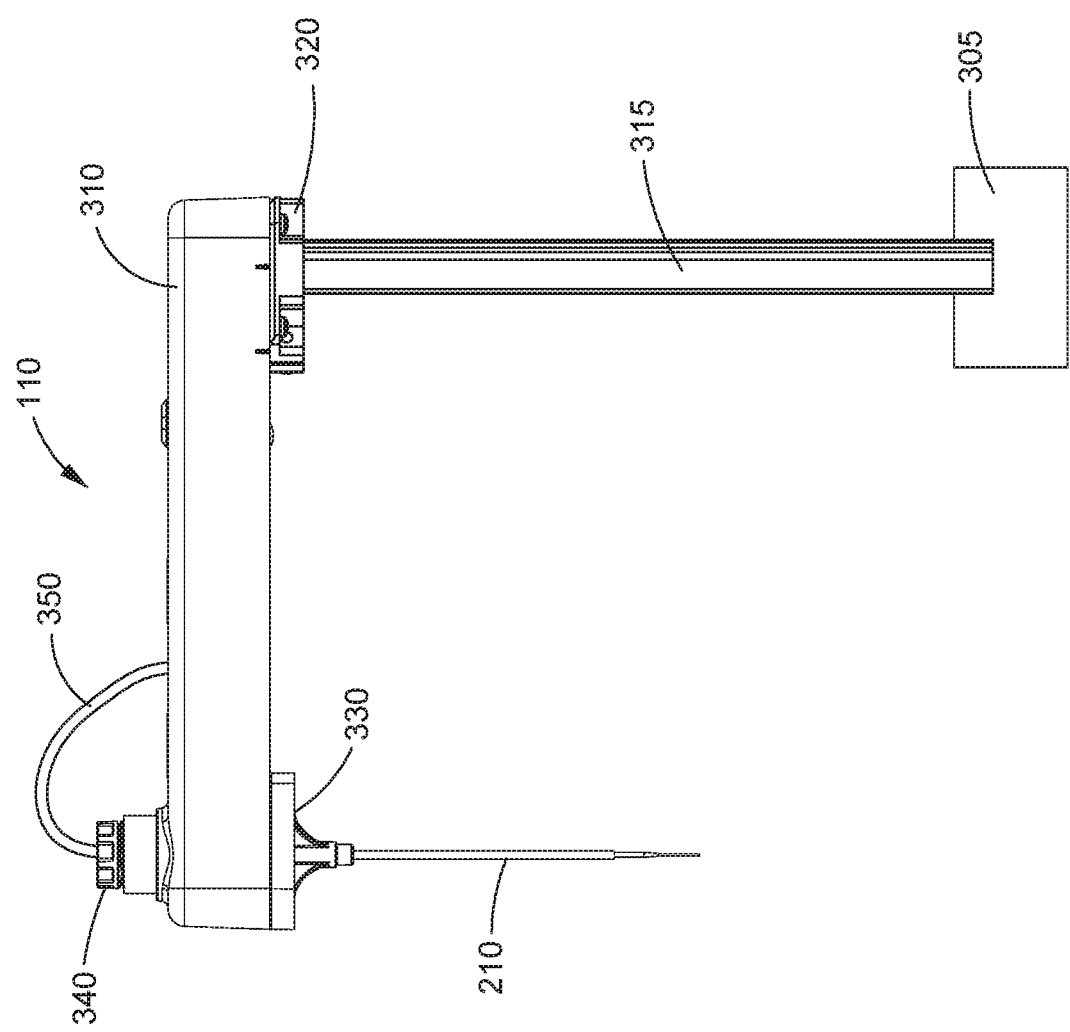
FIG. 4 is a diagram illustrating a side view of a transfer arm with a capacitive liquid level detection assembly, according to an embodiment.
Figure 5:
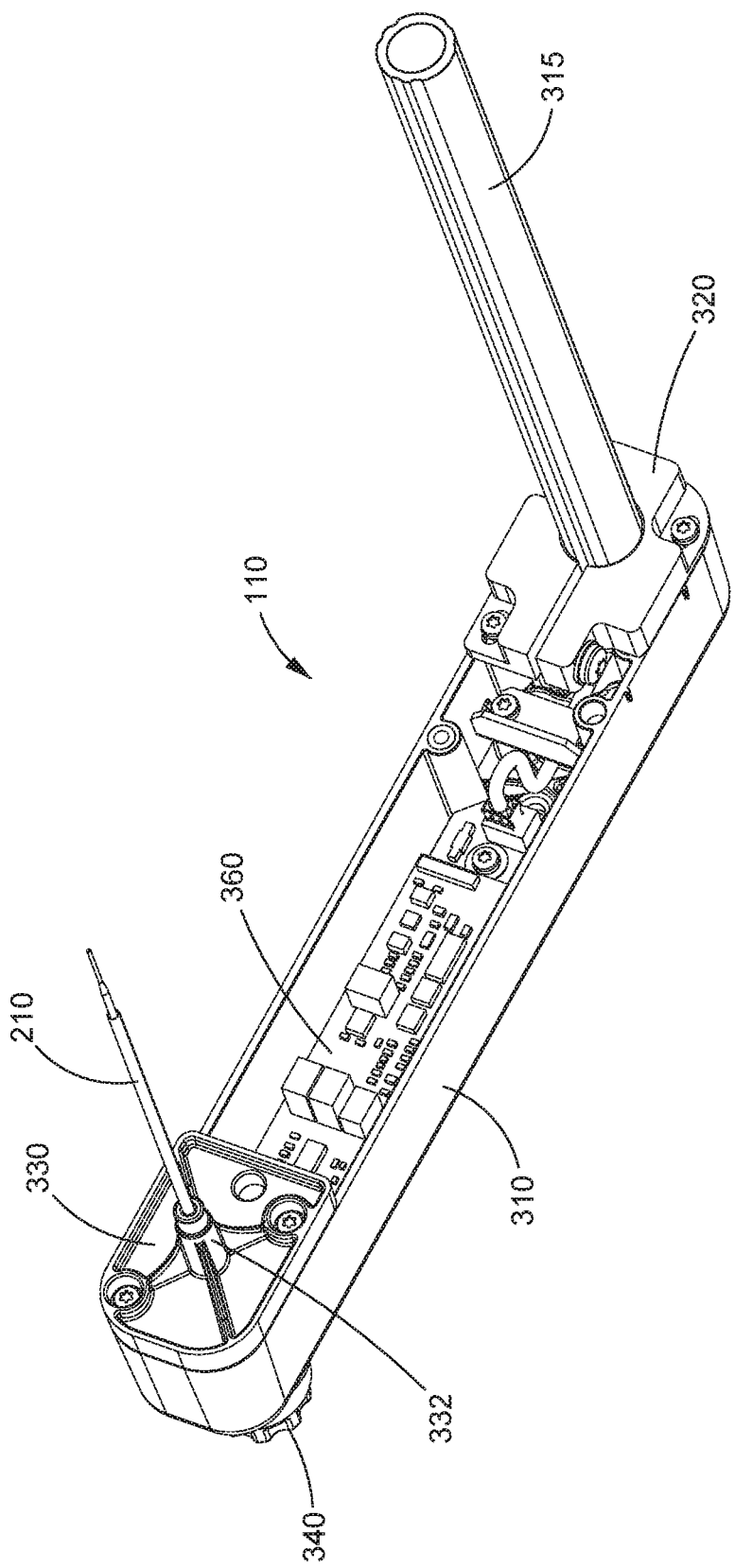
FIG. 5 is a diagram illustrating a bottom perspective view of a transfer arm a capacitive liquid level detection assembly, according to an embodiment.

FIGS. 3-6 provide views of a transfer arm 110 with a capacitive liquid level detection assembly, according to embodiments herein. FIG. 3 is a top perspective view of the transfer arm 110 with the capacitive liquid level detection assembly, FIG. 4 a side view, FIG. 5 a bottom perspective view, and FIG. 6 an exploded, top perspective view.

The transfer arm 110 is comprised of a chassis 310 and a shaft 315, coupled to one another by a coupler, or clamp, 320. A drive mechanism (or motor controller) 305 is coupled to the shaft 315 to drive rotational and vertical movement of the transfer arm 110. The chassis 310 may be a single piece of injection-molded plastic. The chassis 310 acts as both a mounting base and a cover for the transfer arm components.

Figure 7A:
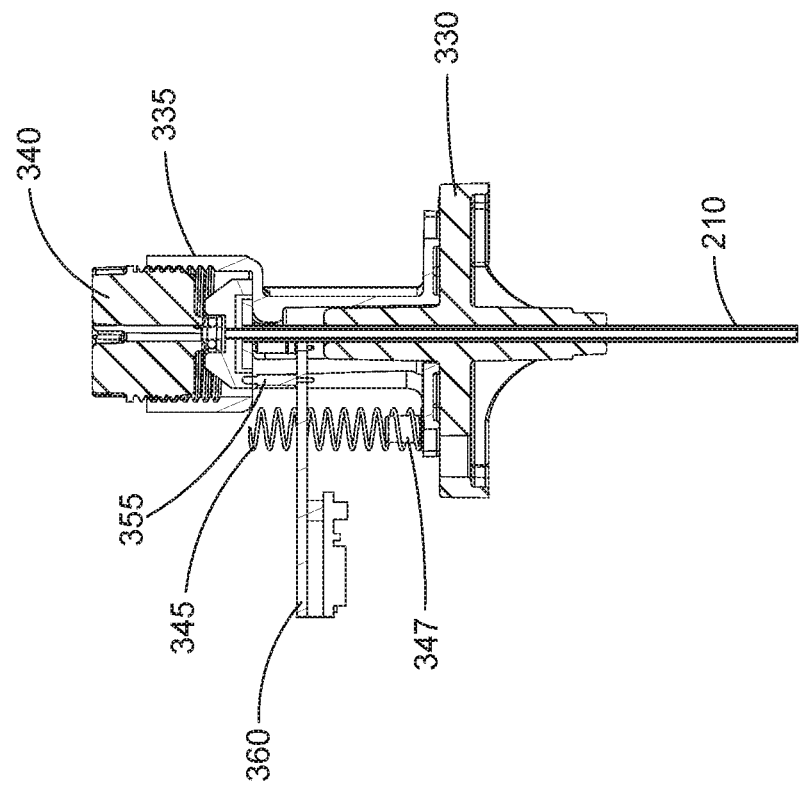
FIGS. 7A-7D are diagrams illustrating a capacitive liquid level detection assembly, according to an embodiment.
Figure 7B:
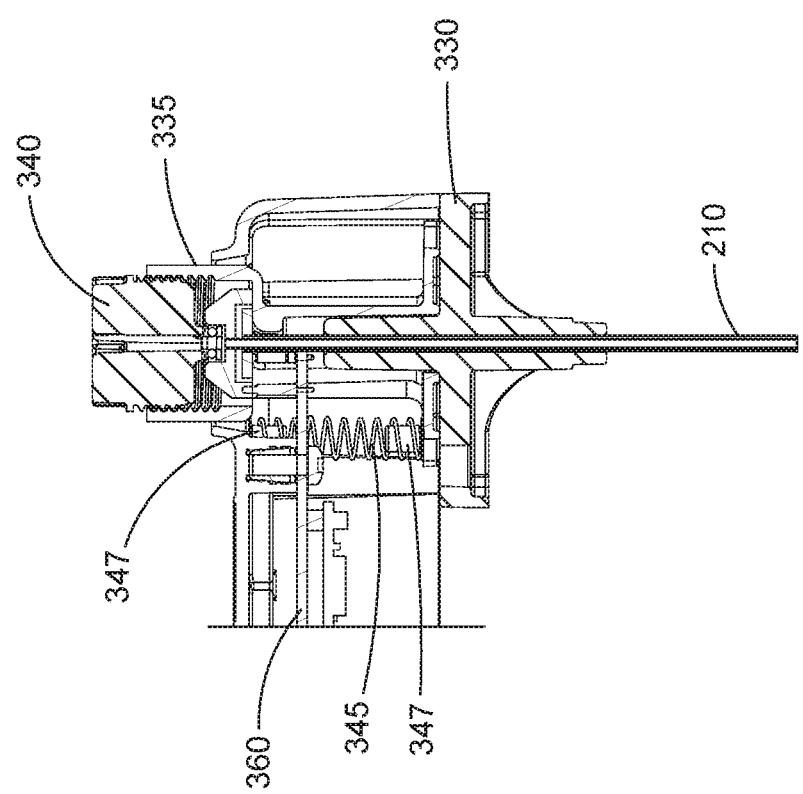
Figure 7D:
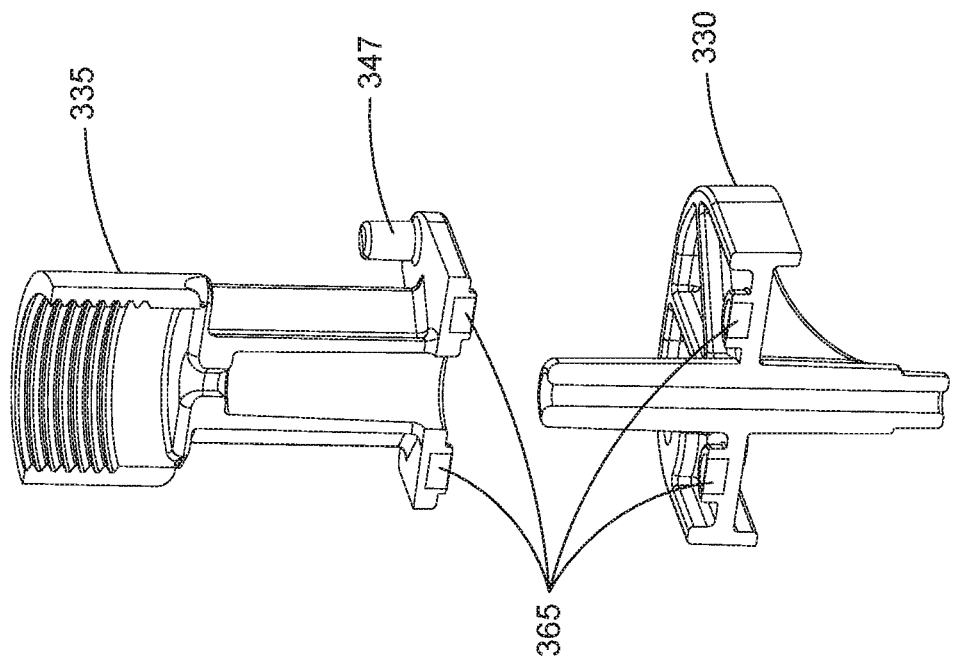
Figure 7C:
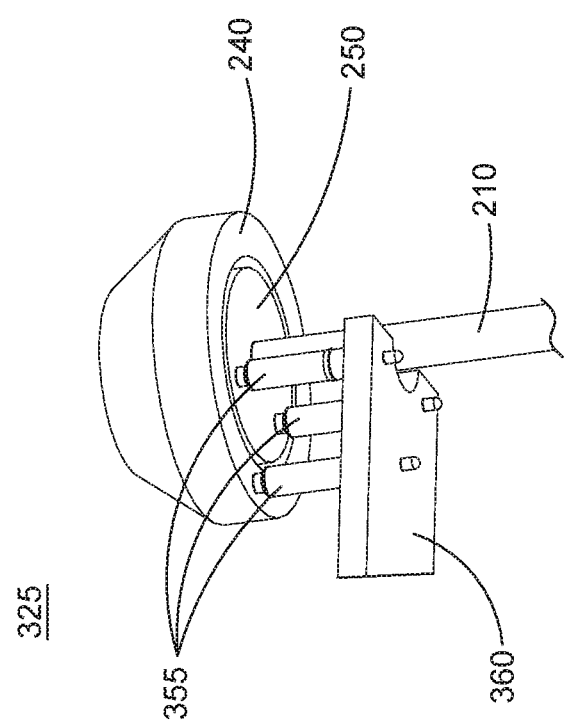

Capacitive liquid level detection assembly 325 may be housed in an underside portion of the chassis 310 of the transfer arm 110, away from the shaft 315, the coupler 320, and the axis of rotation of the transfer arm 110. The capacitive liquid level detection assembly 325 is, according to an embodiment, comprised of a probe 210, a fitting 340, tubing 350, and a capacitive liquid level detection printed circuit assembly (PCA) 360 with pins 355 (see FIG. 7C for detailed view). A probe guide 330, a probe holder 335, compression springs 345, and spring posts 347 may be included as part of a mechanism to hold and engage the probe 210, according to various embodiments. In an embodiment, one or more pairs of magnets 365 may also be included, as described in detail below.

In an embodiment, the probe guide 330 is a stationary component relative to the chassis 310. It contains a long vertical bore 332 through which the probe 210 passes. The bore 332 is sized to provide minimal clearance for the probe 210 while still maintaining free vertical motion. The length of the bore 332 is sized to be of sufficient length to prevent binding as the probe 210 slides vertically. The probe guide 330 is, in an embodiment, made of a material with a low coefficient of friction to provide anti-binding properties and free vertical motion. A surface of the probe guide 330 perpendicular to the bore 332 mounts to an underside portion of the chassis 310.

The probe 210 is placed into the probe holder 335 through a top portion thereof, and may be hand-tightened to seal the tubing 350 against a top orifice of the probe 210 (see FIG. 2D, fluid tubing sealing surface 270) while also securing the probe 210 in place. In an embodiment, the probe holder 335 clamps to the top of the probe 210, and is allowed to travel vertically above the probe guide 330 as the probe 210 slides vertically through the probe guide 330.

In an embodiment, a threaded fitting 340 (e.g., M20 thread size) threads into an internal threaded portion of the probe holder 335 to serve as a probe locking device and both clamps down the probe 210 into the probe holder 335 and also provides for a secure fluid connection between the tubing 350 and the probe 210. In this configuration, removal or installation of the probe 210 is simple and requires no tools, as the fitting 340 can be removed and installed by hand. Once the fitting 340 is unthreaded, the probe 210 can be easily slid up through the probe guide 330 for removal. The probe holder 335 has a gap under the head of the probe 210 to allow for electrical contacts to engage the underside of the probe 210. Thus, in one connection via the fitting 340, mechanical (via the threaded fitting 340), fluid (via the tubing 350), and electrical (via the spring-loaded pins 355) connections are made to the probe 210. The probe holder 335 may also have a tab on the bottom to prevent incorrect assembly.

The tubing 350 that passes through the center bore of the fitting 340 is flared at the end. Behind this flare (between it and the fitting 340), an O-ring is sandwiched between a pair of washers. A protrusion on the end of the fitting 340 presses down on the washer, compressing the O-ring and pressing the tubing flare into a mating surface in a pocket on the top of the probe 210. The contact between the tubing flare and the probe 210 forms the fluid seal. The O-ring performs the function of energizing the joint, which allows for a wider range of tightness of the fitting 340 to properly seal the O-ring. In addition to pressurizing the seal between the tubing 350 and the probe 210, the fitting 340 also presses down the probe 210 into the probe holder 335 to clamp it into place.

Springs 345 and spring posts 347 may be provided between the chassis 310 and the probe holder 335, as part of a spring-loaded mechanical apparatus to detect collisions of the probe 210, according to an embodiment.

Figure 6:
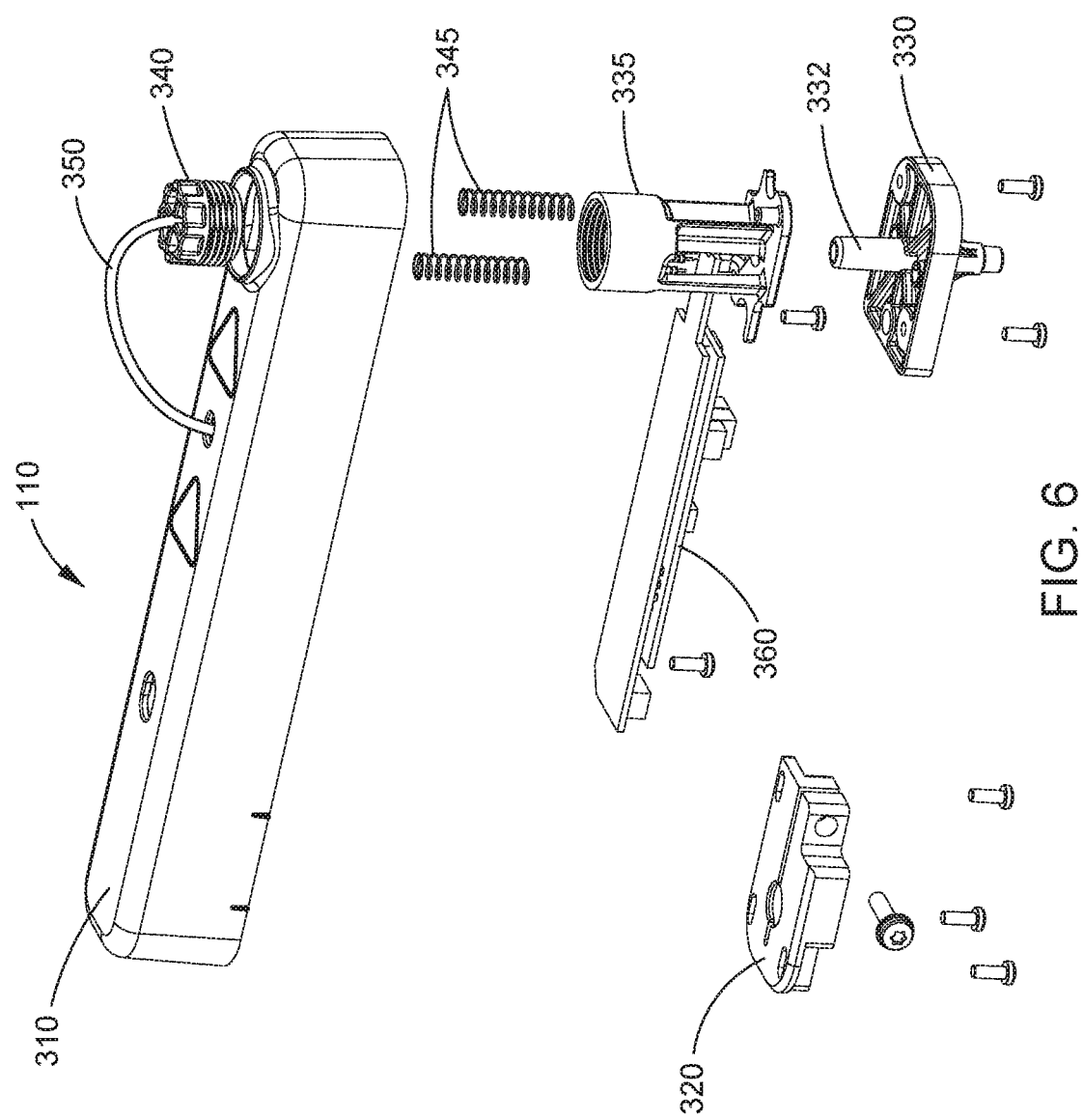
FIG. 6 is a diagram illustrating an exploded, top perspective view of a transfer arm with a capacitive liquid level detection assembly, according to an embodiment.

Also shown in FIG. 6 are various screws and connectors for securing the various components together and to the transfer arm 110, as described herein.

Once the probe 210 is fully seated in the probe holder 335, spring-loaded pins 355 make electrical contact with the probe 210 (described in greater detail below with respect to FIGS. 7A-7D). FIGS. 7A-7D are diagrams illustrating, in greater detail, the capacitive liquid level detection assembly 325, according to embodiments herein.

The capacitive liquid level detection PCA 360 continuously monitors the probe 210 and looks for a significant change in capacitance. The capacitive method is based on the fact that any conductor exhibits a finite electrical capacitance. This capacitance will increase when the probe 210 approaches and touches a liquid or other material having a higher dielectric constant. These capacitances changes are extremely small (e.g., less than one picofarad), requiring very sensitive circuitry. Given the extreme sensitivity required, according to embodiments herein, special precautions are taken to electrically shield the circuitry from outside influences to avoid false detections. To address these concerns, all critical circuitry is contained on the capacitive liquid level detection PCA 360, which is directly soldered to a lower board (level detect carrier PCA) through Berg stick spring-loaded contacts or the like. In an embodiment, the carrier PCA is flooded with a grounded copper plane and acts as a grounded shield for the underside of the capacitive liquid level detection PCA 360. The inside of the transfer arm 110 is, according to an embodiment, copper painted and grounded to the PCA 360, through its mounting screw, to provide a Faraday cage around it. The grounded cylinder (i.e., secondary tube 230) of the probe 210 also serves to minimize false detections and outside influences. Focusing the electric field around the tip of the probe 210 also helps to increase the capacitive signal of the liquid sample. This causes more field lines to be distorted during liquid contact, causing a greater change in electric potential, resulting in a greater capacitive change.

According to an embodiment, three spring-loaded "pogo-pin" electrical contacts 355 are mounted to the PCA 360, which is mounted within an underside portion of the chassis 310 of the transfer arm 110. A single pin 355 contacts the outer ring 240, creating the connection between the primary tube 220 and the PCA 360. A second pin 355 contacts the inner ring 250 to ground the secondary tube 230. In an embodiment, a third pin can be used for other mechanisms, such as probe crash detection or probe presence detection. In another embodiment, the third pin is not needed. The pins 355 extend from the PCA 360 through the clearance hole (i.e., gap) in the bottom of the probe holder 335, to contact the two rings 240, 250 on the underside of the head of the probe 210. In an embodiment, IDI C Series pins (CP-2.5-6-TH) are used for the spring-loaded pins 355. In an embodiment, the pins 355 are gold plated to ensure a good electrical connection. According to an embodiment, the pins 355 may be soldered to the PCA 360 using thru-hole mounting to maximize the amount of mechanical stress the design can take. In an embodiment, the pins 355 have a working travel or compression specification of 2.0 mm maximum.

Stability of the connection between the PCA 360 and the probe 210 is critical to prevent false, spurious measurements, as any movement between the pin contacts 355 and the probe 210 can create a false measurement. Thus the capacitive liquid level detection mechanism 325 may, in an embodiment, utilize magnets 365 in addition to the springs 345 to firmly couple the moving (e.g., the probe 210, the probe holder 335, and the fitting 340) and stationary (e.g., the probe guide 330) halves of the mechanism 325 to prevent such movement as would otherwise be caused by vibration and other motions of the transfer arm 110. In addition to or alternative to the springs 345 and the magnets 365, a spring constant force, a shock absorber, and the like may be utilized. In yet another embodiment, the springs 345 and the magnets 365 are not included, and instead the probe holder 335 is fastened (screwed, glued, or the like) directly to the probe guide 330. In another embodiment, the probe holder 335 and the probe guide 330 are one single unit or component.

As noted above, capacitive sensing technology is used to detect liquid level. The PCA 360 is designed to provide a signal when a change in capacitance above a predetermined threshold is detected. That change occurs when the probe 210 (i.e., the "sensor") transitions from air to liquid. The probe 210 can be envisioned as a "bucket" (i.e., the probe's capacitance) that can store energy (i.e., "water in the bucket"). A voltage is applied to the probe 210 at a given frequency, causing the probe 210 to charge and discharge (fill and empty the bucket). The rate of charging is related to the capacitance, or "size of the bucket." The time it takes for the probe 210 to charge (i.e., the bucket to "fill") to a given level is monitored and is related to the application voltage frequency as a duty cycle. Changes in this duty cycle are thus proportional to the capacitance change. When the probe 210 touches liquid, the system capacitance is increased (the "bucket" gets larger), causing the charging time to increase. The rate of change of the duty cycle is monitored, and when it exceeds a given threshold, the capacitive sensor is "tripped." External charges adding to the probe voltage, as well as voltage leaking from the probe 210, are both noise factors that will affect the measurement (which is the apparent rate of charging or "filling").

According to embodiments herein, minimizing the distance between the sensing electronics (i.e., the components on the capacitive liquid level detection PCA 360) and the probe 210 reduces the effects of any stray capacitance that may alter the capacitive measurements. Stray capacitance is an unwanted or unintended capacitance created by any pair of objects (at different electric potentials) that are near each other. For example, the wires within the cabling connecting the electronics and the probe 210, any objects near the PCA 360, or traces within the PCA 360 itself can generate stray capacitance.

Figure 8:
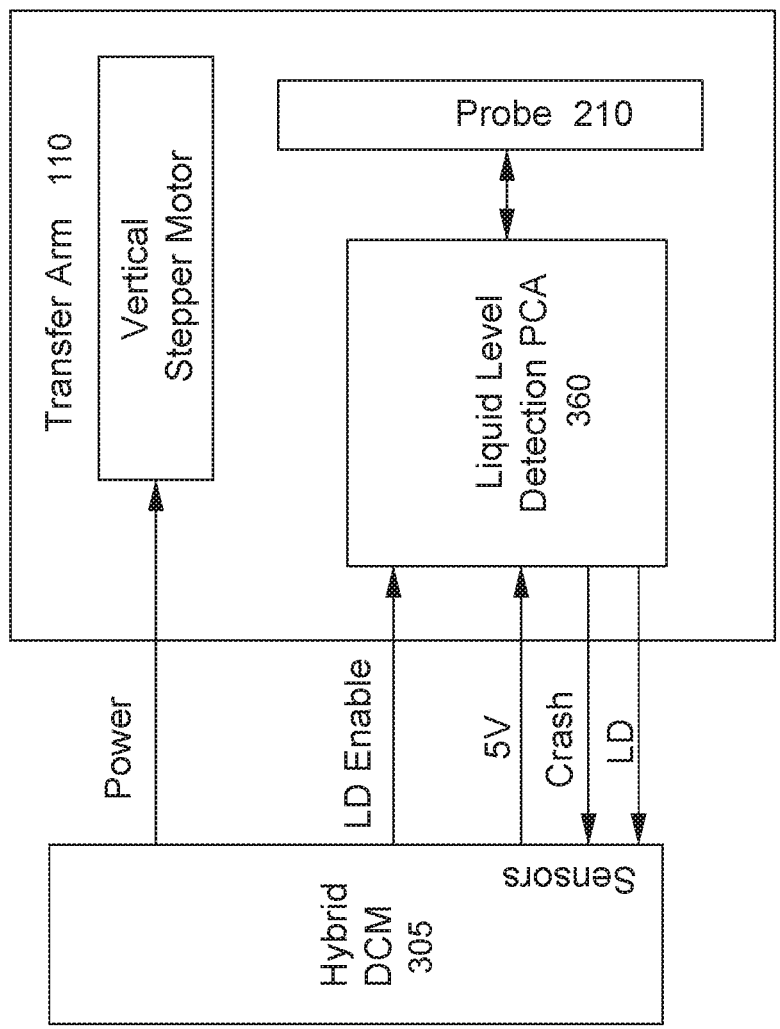
FIG. 8 is a capacitive liquid level detection block diagram, according to an embodiment.

FIG. 8 is a capacitive liquid level detection block diagram 800, according to an embodiment. The capacitive liquid level detection PCA 360 provides the liquid level sensing elements for the transfer arm 110. As described above, the PCA 360 is connected to the probe 210 within the transfer arm 110. The outputs of the PCA 360 are connected to sensor inputs on the motor controller 305, which is responsible for driving the transfer arm's vertical motor, which moves the probe 210 towards the sample. According to an embodiment, one sensor activates if liquid is detected while the other activates if a vertical crash occurs. In an embodiment, only one sensor input may be provided on the motor controller 305 (i.e., a sensor for liquid detection). When the motor controller 305 receives a "Seek Position" command from, for example, a network, it moves the probe 210 down towards the liquid until liquid is detected. The moment that liquid is detected, the PCA 360 sends a signal (e.g., a digital one shot pulse) to the motor controller 305 as an indication of the detection. The motor controller 305 reacts and begins to decelerate the probe 210 until it is submerged to the required depth. If no detection occurs, the PCA 360 sends no signals, and the motor controller 305 will move the probe 210 down until the maximum allowable steps are taken. This configuration avoids the latency of sending the signals through the network and allows the motor controller 305 to react quickly to any sensed event.

Figure 9:
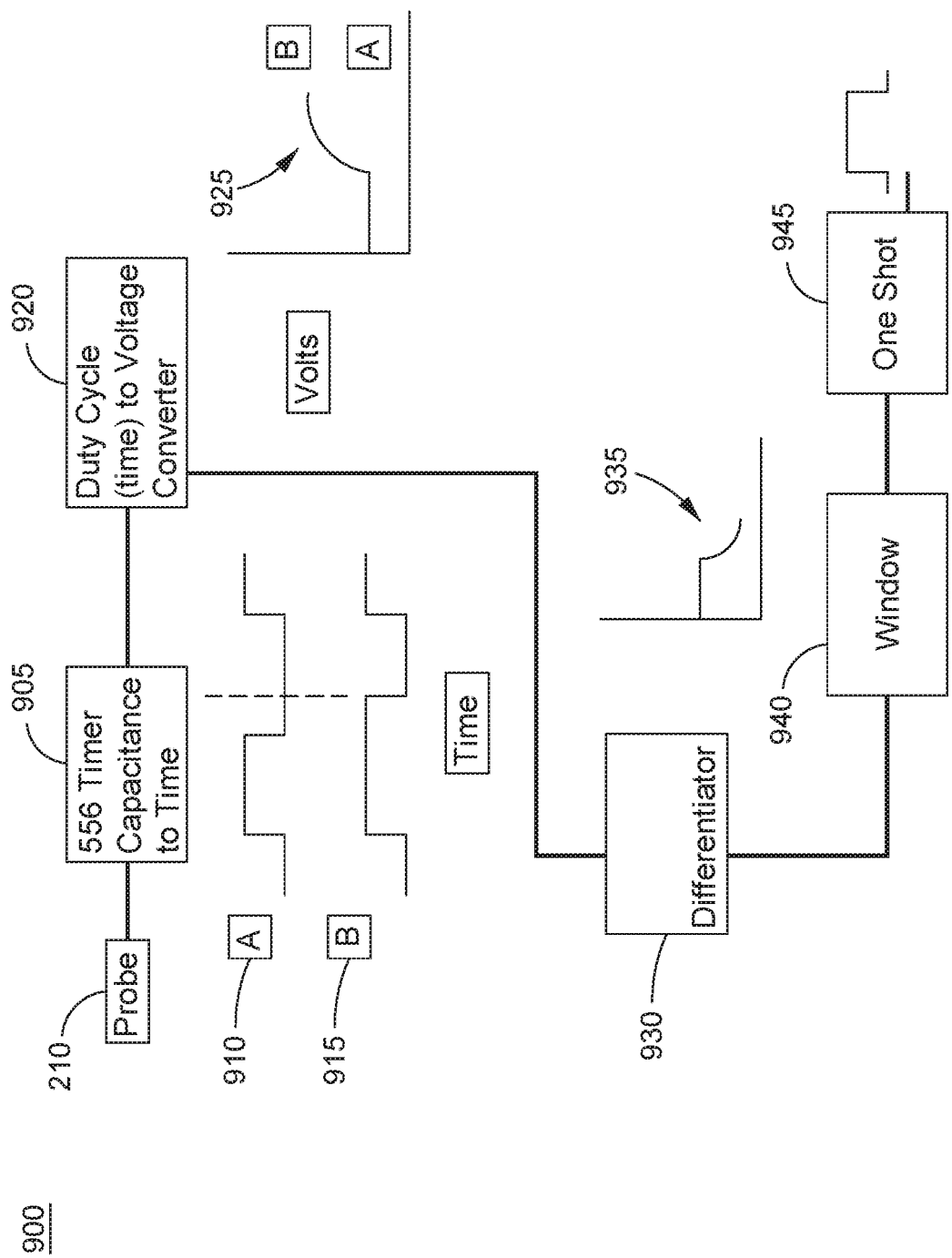
FIG. 9 is a capacitive liquid level detection circuit diagram, according to an embodiment.

FIG. 9 is a capacitive liquid level detection circuit diagram 900, according to an embodiment. The capacitive liquid level detection circuity includes three main stages, according to an embodiment. The first stage continuously charges and discharges the probe 210 to measure its capacitance. As shown by the 556 Timer 905 in FIG. 9, this stage produces a rectangular wave with a duty cycle proportional to the capacitance seen by the probe 210. The plot labeled "A" (910) shows the rectangular wave before the probe touches liquid. "B" (915) shows the rectangular wave the moment the probe 210 is submerged into the liquid. The increase in capacitance, due to the liquid, increases the charge time and the width of the rectangle wave.

The second stage estimates the rate of capacitance change by bandpass filtering the rectangular wave signal. The filter has a low pass filter, shown by the "Duty Cycle to Voltage Converter" 920, that converts the rectangular wave to an analog signal with an amplitude proportional to the duty cycle, resulting in an analog signal directly related to the capacitance of the probe 210. The corresponding plot 925 shows the analog signal transitioning from the moment it touches the liquid. The signal starts from level "A" before liquid is touched. Once the probe touches liquid, the signal starts its transition to level "B." After a finite period of time (roughly 5 ms for 0.3 pF input), the signal reaches the steady state level of "B."

A high pass filter, or a differentiator circuit 930, is then applied, resulting in a signal 935 with an amplitude roughly proportional to the capacitive rate of change. The output of this filter is at a level corresponding to zero before liquid is touched. Once liquid is touched, the output of the differentiator 930 starts to respond to the changing analog signal. (Note the figure shows a negative change since the circuit is configured using an inverting amplifier for simplicity.)

As the differentiator 930 responds to the changing capacitance, the third stage compares the output to see if the change is large enough. If so, the window comparator 940 triggers a one shot pulse 945 that is sent back to the motor controller 305 to indicate that liquid has been detected.

According to an embodiment, the capacitive liquid level detection assembly described herein utilizes a combination of hardware and software to stop the probe 210 just beneath the surface of the detected liquid to allow for aspiration of the liquid. This ensures that the probe 210 is sufficiently immersed for a successful aspiration, while minimizing the amount of the exterior of the probe 210 that is in contact with the liquid, thus minimizing external carryout and the potential for probe spatter.

According to an embodiment, the liquid level detection may also be used for secondary functions, such as auto-alignment, liquid presence confirmation, and self-diagnostics.

According to an embodiment, the liquid level detection PCA 360 can be disabled as needed. For example, the rapid charging and discharge of the probe 210 when the PCA 360 is active may interfere with an electrolyte or electrochemical detector on a clinical analyzer, in which case the PCA 360 may be deactivated for electrolyte or electrochemical deliveries.

Figure 10:
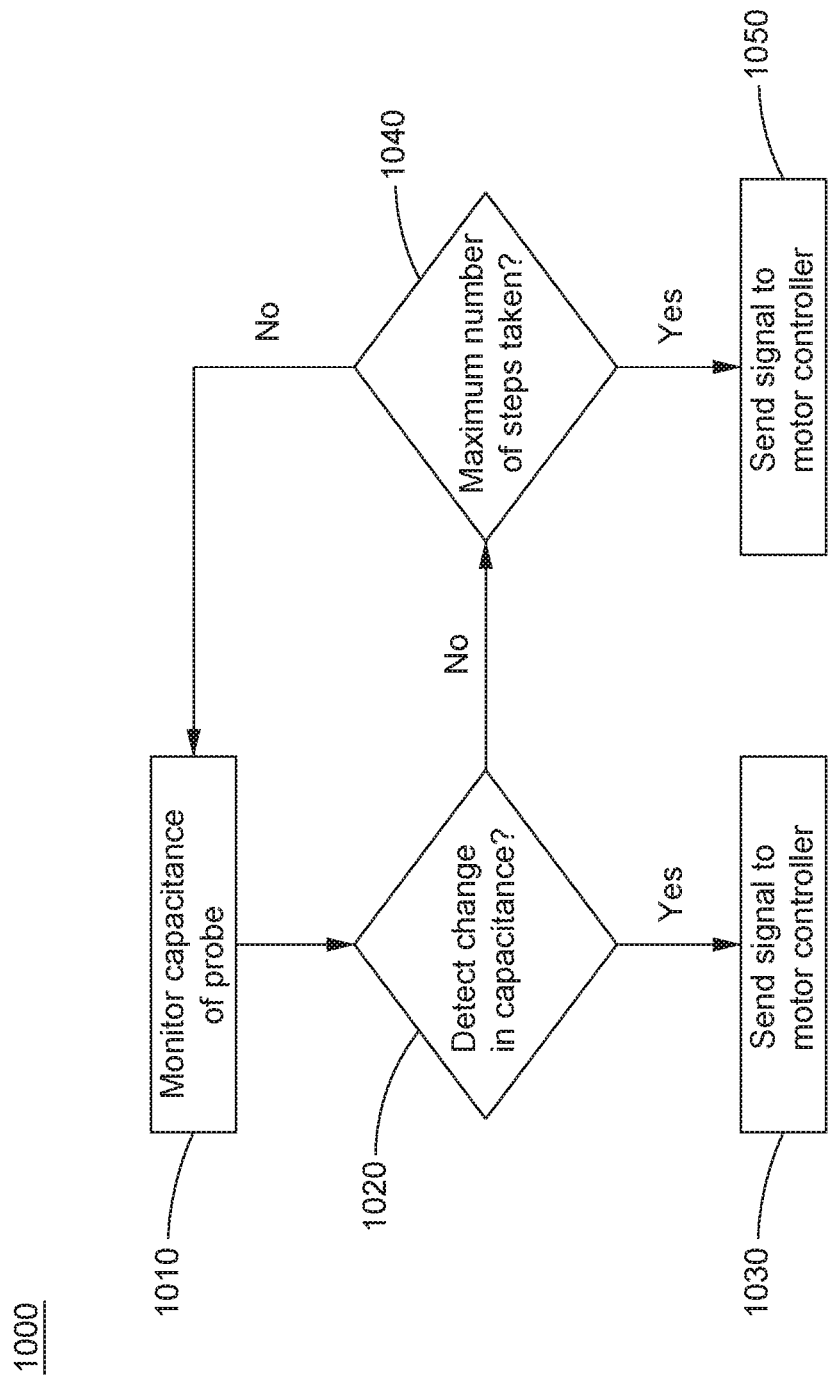
FIG. 10 is a flow diagram illustrating a method for liquid level detection utilizing a capacitive liquid level detection circuit, according to an embodiment.

FIG. 10 is a flow diagram 1000 illustrating a method for liquid level detection utilizing a capacitive liquid level detection circuit, according to an embodiment, in, for example, an IVD environment. The method utilizes various aspects of the capacitive liquid level detection assembly and PCA 360 described herein.

At 1010, capacitance of a probe 210 is monitored. In an embodiment, the capacitive liquid level detection PCA 360 continuously monitors the capacitance of the probe 210 to detect when the probe 210 encounters a liquid in a container on a clinical analyzer, for example. In an embodiment, the capacitance may be monitored upon a command received by the motor controller 305, in which case the capacitance is monitored while the transfer arm 110/probe 210 are being moved towards liquid in a container.

At 1030, upon detection at 1020 in a change in the capacitance indicating a detection of liquid, a signal is sent from the capacitive liquid level detection PCA 360 to the motor controller 305.

If a change in the capacitance is not detected, at 1040, a determination is made as to whether the maximum, predefined number of steps have been taken by the motor controller 305. If the maximum number of steps have not been taken, the method resumes with monitoring the capacitance. If the maximum, predefined number of steps have been taken, then at 1050, a signal is sent to the motor controller 305.

According to an embodiment, when the motor controller 305 receives the signal of liquid detection or maximum number of steps taken, the motor controller 305 reacts by beginning to decelerate the probe 210 until it is submerged to a required, predefined depth. If no signal is sent, according to an embodiment, the probe is decelerated to a stop (not within liquid).

Advantages of the capacitive liquid level detection assembly 325 include the ease of use for the user to remove and install a transfer probe 210 through a single, hand-tightened connection (the fitting 340) to include fluid, mechanical, and electrical connections. Impacts include fewer requirements for user interaction; fewer service calls and visits, easy customer maintenance, automated electrical connections (thus less opportunity to create an incorrect connection).

Figure 11:
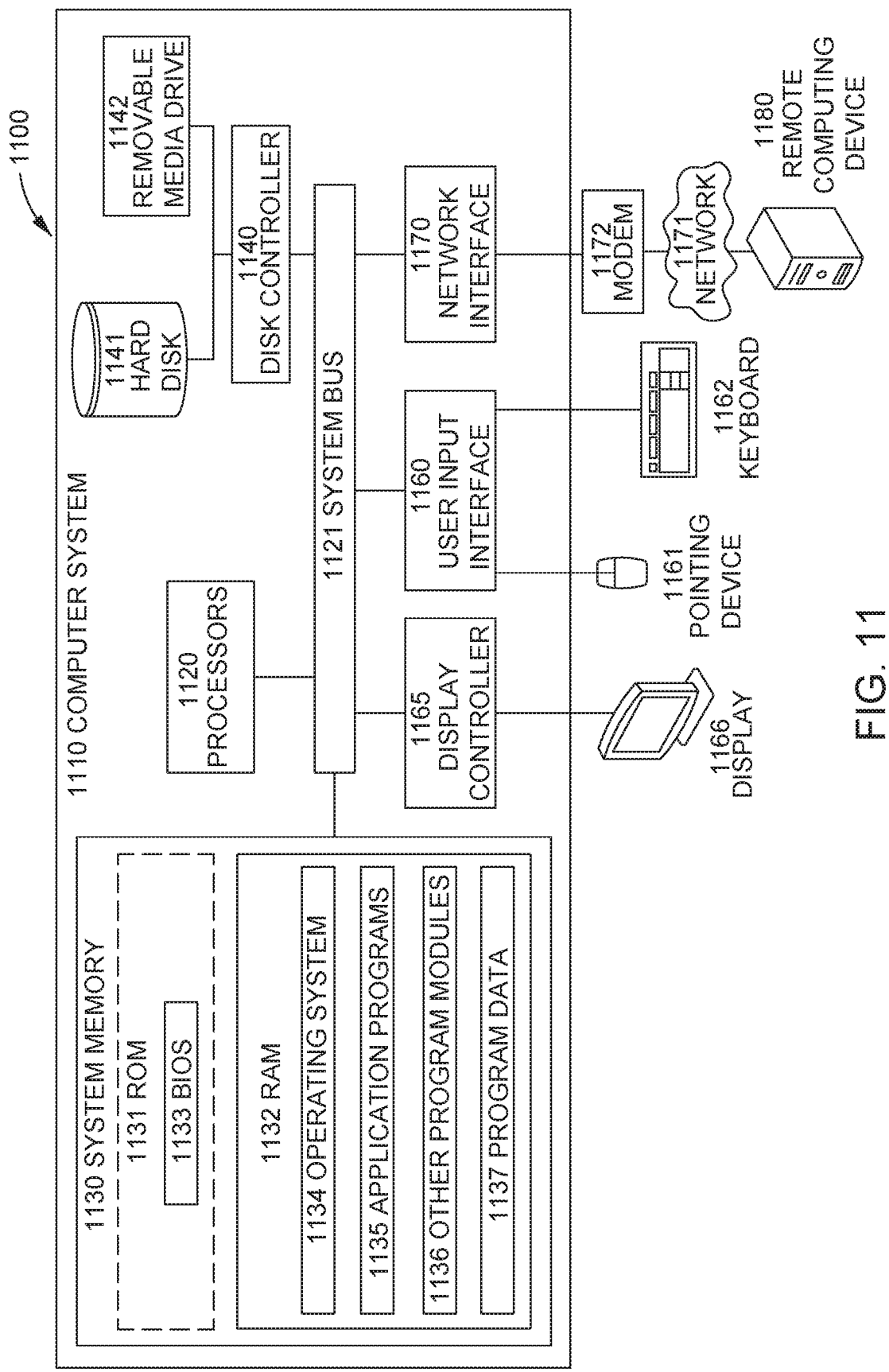
FIG. 11 illustrates an exemplary computing environment within which embodiments of the invention may be implemented.

FIG. 11 illustrates an exemplary computing environment 1100 within which embodiments of the invention may be implemented. Computing environment 1100 may include computer system 1110, which is one example of a general purpose computing system upon which embodiments of the invention may be implemented. Computers and computing environments, such as computer 1110 and computing environment 1100, are known to those of skill in the art and thus are described briefly here.

As shown in FIG. 11, the computer system 1110 may include a communication mechanism such as a bus 1121 or other communication mechanism for communicating information within the computer system 1110. The system 1110 further includes one or more processors 1120 (such as the controller described above, configured to control operation of the various components, including the probes, the turntables, and the rings) coupled with the bus 1121 for processing the information. The processors 1120 may include one or more central processing units (CPUs), graphical processing units (GPUs), or any other processor known in the art.

The computer system 1110 also includes a system memory 1130 coupled to the bus 1121 for storing information and instructions to be executed by processors 1120. The system memory 1130 may include computer readable storage media in the form of volatile and/or nonvolatile memory, such as read only memory (ROM) 1131 and/or random access memory (RAM) 1132. The system memory RAM 1132 may include other dynamic storage device(s) (e.g., dynamic RAM, static RAM, and synchronous DRAM). The system memory ROM 1131 may include other static storage device(s) (e.g., programmable ROM, erasable PROM, and electrically erasable PROM). In addition, the system memory 1130 may be used for storing temporary variables or other intermediate information during the execution of instructions by the processors 1120. A basic input/output system (BIOS) 1133 containing the basic routines that help to transfer information between elements within computer system 1110, such as during start-up, may be stored in ROM 1131. RAM 1132 may contain data and/or program modules that are immediately accessible to and/or presently being operated on by the processors 1120. System memory 1130 may additionally include, for example, operating system 1134, application programs 1135, other program modules 1136 and program data 1137.

The computer system 1110 also includes a disk controller 1140 coupled to the bus 1121 to control one or more storage devices for storing information and instructions, such as a magnetic hard disk 1141 and a removable media drive 1142 (e.g., floppy disk drive, compact disc drive, tape drive, and/or solid state drive). The storage devices may be added to the computer system 1110 using an appropriate device interface (e.g., a small computer system interface (SCSI), integrated device electronics (IDE), Universal Serial Bus (USB), or FireWire).

The computer system 1110 may also include a display controller 1165 coupled to the bus 1121 to control a display or monitor 1166, such as a cathode ray tube (CRT) or liquid crystal display (LCD), for displaying information to a computer user. The computer system 1110 includes an input interface 1160 and one or more input devices, such as a keyboard 1162 and a pointing device 1161, for interacting with a computer user and providing information to the processors 1120. The pointing device 1161, for example, may be a mouse, a trackball, or a pointing stick for communicating direction information and command selections to the processors 1120 and for controlling cursor movement on the display 1166. The display 1166 may provide a touch screen interface which allows input to supplement or replace the communication of direction information and command selections by the pointing device 1161.

The computer system 1110 may perform a portion or all of the processing steps of embodiments of the invention in response to the processors 1120 executing one or more sequences of one or more instructions contained in a memory, such as the system memory 1130. Such instructions may be read into the system memory 1130 from another computer readable medium, such as a hard disk 1141 or a removable media drive 1142. The hard disk 1141 may contain one or more data-stores and data files used by embodiments of the present invention. Data-store contents and data files may be encrypted to improve security. The processors 1120 may also be employed in a multi-processing arrangement to execute the one or more sequences of instructions contained in system memory 1130. In alternative embodiments, hard-wired circuitry may be used in place of or in combination with software instructions. Thus, embodiments are not limited to any specific combination of hardware circuitry and software.

As stated above, the computer system 1110 may include at least one computer readable medium or memory for holding instructions programmed according embodiments of the invention and for containing data structures, tables, records, or other data described herein. The term "computer readable medium" as used herein refers to any medium that participates in providing instructions to the processors 1120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1141 or removable media drive 1142. Non-limiting examples of volatile media include dynamic memory, such as system memory 1130. Non-limiting examples of transmission media include coaxial cables, copper wire, and fiber optics, including the wires that make up the bus 1121. Transmission media may also take the form of acoustic or light waves, such as those generated during radio wave and infrared data communications.

The computing environment 1100 may further include the computer system 1110 operating in a networked environment using logical connections to one or more remote computers, such as remote computer 1180. Remote computer 1180 may be a personal computer (laptop or desktop), a mobile device, a server, a router, a network PC, a peer device or other common network node, and typically includes many or all of the elements described above relative to computer system 1110. When used in a networking environment, computer system 1110 may include modem 1172 for establishing communications over a network 1171, such as the Internet. Modem 1172 may be connected to system bus 1121 via user network interface 1170, or via another appropriate mechanism.

Network 1171 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1110 and other computers (e.g., remote computing system 1180). The network 1171 may be wired, wireless, or a combination thereof. Wired connections may be implemented using Ethernet, Universal Serial Bus (USB), RJ-11, or any other wired connection generally known in the art. Wireless connections may be implemented using Wi-Fi, WiMAX, Bluetooth, infrared, cellular networks, satellite, or any other wireless connection methodology generally known in the art. Additionally, several networks may work alone or in communication with each other to facilitate communication in the network 1171.

As described herein, the various systems, subsystems, agents, managers, and processes can be implemented using hardware components, software components, and/or combinations thereof.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A capacitive liquid level detection assembly for use on a transfer arm in a clinical analyzer in an in vitro diagnostics (IVD) environment, the assembly comprising:
    a capacitive liquid level detection printed circuit assembly (PCA) comprising a plurality of spring-loaded pins and capacitive liquid level detection circuitry;
    a lower board to which the capacitive liquid level detection PCA is soldered, the lower board flooded with a grounded copper plane;
    a probe comprising a primary tube nested within a secondary tube, wherein the primary tube and the secondary tube comprise respective heads at respective top portions thereof forming a set of electrically isolated surfaces; and
    a fitting configured to secure the probe within the transfer arm and thereby establish a connection between the capacitive liquid level detection PCA and the probe;
    wherein the circuitry of the capacitive liquid level detection PCA is configured to detect a change in capacitance of the probe and send a level detection signal to a motor controller configured to control operation of the transfer arm.

2. The capacitive liquid level detection assembly of claim 1, where upon receipt of the level detection signal, the motor controller decelerates the transfer arm.

3. The capacitive liquid level detection assembly of claim 1, wherein the connection comprises the spring-loaded pins of the capacitive liquid level detection PCA in contact with the set of electrically isolated surfaces of the probe.

4. The capacitive liquid level detection assembly of claim 3, wherein a first of the plurality of the spring-loaded pins creates a circuit with the primary tube of the probe via contact with the head of the primary tube, and wherein a second of the plurality of the spring-loaded pins grounds the secondary tube via contact with the head of the secondary tube.

5. A capacitive liquid level detection assembly for use on a transfer arm in a clinical analyzer in an in vitro diagnostics (IVD) environment, the assembly comprising:
    a capacitive liquid level detection printed circuit assembly (PCA) comprising a plurality of spring-loaded pins and capacitive liquid level detection circuitry;
    a probe comprising a primary tube nested within a secondary tube, wherein the primary tube and the secondary tube comprise respective heads at respective top portions thereof forming a set of electrically isolated surfaces; and
    a fitting configured to secure the probe within the transfer arm and thereby establish a connection between the capacitive liquid level detection PCA and the probe;
    wherein the underside portion of the chassis is copper painted and grounded to the capacitive liquid level detection PCA through a mounting screw;
    wherein the circuitry of the capacitive liquid level detection PCA is configured to detect a change in capacitance of the probe and send a level detection signal to a motor controller configured to control operation of the transfer arm, wherein the motor controller is coupled to the shaft.

6. The capacitive liquid level detection assembly of claim 5, where upon receipt of the level detection signal, the motor controller decelerates the transfer arm.

7. The capacitive liquid level detection assembly of claim 5, wherein the connection comprises the spring-loaded pins of the capacitive liquid level detection PCA in contact with the set of electrically isolated surfaces of the probe.

8. The capacitive liquid level detection assembly of claim 7, wherein a first of the plurality of the spring-loaded pins creates a circuit with the primary tube of the probe via contact with the head of the primary tube, and wherein a second of the plurality of the spring-loaded pins grounds the secondary tube via contact with the head of the secondary tube.

9. A capacitive liquid level detection assembly for use on a transfer arm in a clinical analyzer in an in vitro diagnostics (IVD) environment, the assembly comprising:
    a capacitive liquid level detection printed circuit assembly (PCA) comprising a plurality of spring-loaded pins and capacitive liquid level detection circuitry;
    a probe comprising a primary tube nested within a secondary tube, wherein the primary tube and the secondary tube comprise respective heads at respective top portions thereof forming a set of electrically isolated surfaces;

a probe holder configured to clamp to a top portion of the probe and comprising a gap at a portion corresponding to the set of electrically isolated surfaces of the probe;

a probe guide comprising a vertically-oriented bore through which the probe passes, wherein a surface of the probe guide perpendicular to the bore mounts to an underside portion of the transfer arm; and a fitting configured to secure the probe within the transfer arm and thereby establish a connection between the capacitive liquid level detection PCA and the probe; wherein the fitting is further configured to thread into the probe holder to clamp the probe into the probe holder;

wherein the circuitry of the capacitive liquid level detection PCA is configured to detect a change in capacitance of the probe and send a level detection signal to a motor controller configured to control operation of the transfer arm.

10. The capacitive liquid level detection assembly of claim 9, further comprising:

at least one of a spring assembly and one or more pairs of magnets to secure the probe holder and the probe guide to one another.

11. The capacitive liquid level detection assembly of claim 9, where upon receipt of the level detection signal, the motor controller decelerates the transfer arm.

12. The capacitive liquid level detection assembly of claim 9, wherein the connection comprises the spring-loaded pins of the capacitive liquid level detection PCA in contact with the set of electrically isolated surfaces of the probe.

13. The capacitive liquid level detection assembly of claim 12, wherein a first of the plurality of the spring-loaded pins creates a circuit with the primary tube of the probe via contact with the head of the primary tube, and wherein a second of the plurality of the spring-loaded pins grounds the secondary tube via contact with the head of the secondary tube.

14. A system for detecting liquid in a container in a clinical analyzer in an in vitro diagnostics (IVD) environment, the system comprising:

a transfer arm comprising a horizontally-extending chassis and a shaft oriented substantially perpendicular to the chassis, the chassis and the shaft coupled to one another by a coupler at a rear portion of the transfer arm;

a motor controller coupled to the shaft, the motor controller configured to control movement of the transfer arm;

a capacitive liquid level detection assembly housed within an underside portion of the chassis, the capacitive liquid level detection assembly comprising:

a capacitive liquid level detection printed circuit assembly (PCA) comprising a plurality of spring-loaded pins;

a probe comprising a primary tube nested within a secondary tube, wherein the primary tube and the secondary tube comprise respective heads at respective top portions thereof forming a set of electrically isolated surfaces;

a fitting configured to secure the probe within the transfer arm and thereby establish a connection between the capacitive liquid level detection PCA and the probe; and wherein circuitry of the capacitive liquid level detection PCA is configured to detect a change in capacitance of the probe and send a level detection signal to the motor controller;

wherein the underside portion of the chassis is copper painted and grounded to the capacitive liquid level detection PCA through a mounting screw.

15. The system of claim 14, wherein the connection comprises the spring-loaded pins of the capacitive liquid level detection PCA in contact with the set of electrically isolated surfaces of the probe.

16. The system of claim 15, wherein a first of the plurality of the spring-loaded pins creates a circuit with the primary tube of the probe via contact with the head of the primary tube, and wherein a second of the plurality of the spring-loaded pins grounds the secondary tube via contact with the head of the secondary tube.

17. A system for detecting liquid in a container in a clinical analyzer in an in vitro diagnostics (IVD) environment, the system comprising:

a transfer arm comprising a horizontally-extending chassis and a shaft oriented substantially perpendicular to the chassis, the chassis and the shaft coupled to one another by a coupler at a rear portion of the transfer arm;

a motor controller coupled to the shaft, the motor controller configured to control movement of the transfer arm;

a capacitive liquid level detection assembly housed within an underside portion of the chassis, the capacitive liquid level detection assembly comprising:

a capacitive liquid level detection printed circuit assembly (PCA) comprising a plurality of spring-loaded pins;

a probe comprising a primary tube nested within a secondary tube, wherein the primary tube and the secondary tube comprise respective heads at respective top portions thereof forming a set of electrically isolated surfaces;

a probe holder configured to clamp to a top portion of the probe and comprising a gap at a portion corresponding to the set of electrically isolated surfaces of the probe;

a probe guide comprising a vertically-oriented bore through which the probe passes, wherein a surface of the probe guide perpendicular to the bore mounts to an underside portion of the transfer arm; and a fitting configured to secure the probe within the transfer arm and thereby establish a connection between the capacitive liquid level detection PCA and the probe; wherein the fitting is further configured to thread into the probe holder to clamp the probe into the probe holder;

wherein circuitry of the capacitive liquid level detection PCA is configured to detect a change in capacitance of the probe and send a level detection signal to the motor controller.

18. The system of claim 17, wherein a first of the plurality of the spring-loaded pins creates a circuit with the primary tube of the probe via contact with the head of the primary tube, and wherein a second of the plurality of the spring-loaded pins grounds the secondary tube via contact with the head of the secondary tube.

19. The system of claim 17, wherein the connection comprises the spring-loaded pins of the capacitive liquid level detection PCA in contact with the set of electrically isolated surfaces of the probe.

20. The system of claim 19, further comprising:

at least one of a spring assembly and one or more pairs of magnets to secure the probe holder and the probe guide to one another.

* * * * *